(12) United States Patent
Zhu et al.

(10) Patent No.: US 10,798,369 B2
(45) Date of Patent: Oct. 6, 2020

(54) THREE-DIMENSIONAL DISPLAY DEVICE

(71) Applicant: BOE TECHNOLOGY GROUP CO., LTD., Beijing (CN)

(72) Inventors: Jinye Zhu, Beijing (CN); Chenyu Chen, Beijing (CN); Wenqing Zhao, Beijing (CN); Xiaochuan Chen, Beijing (CN); Xue Dong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/990,016

(22) Filed: May 25, 2018

(65) Prior Publication Data
US 2019/0028695 A1     Jan. 24, 2019

(30) Foreign Application Priority Data

Jul. 21, 2017   (CN) .......................... 2017 1 0599518

(51) Int. Cl.
*H04N 13/324* (2018.01)
*H04N 13/31* (2018.01)

(52) U.S. Cl.
CPC ........... *H04N 13/324* (2018.05); *H04N 13/31* (2018.05); *H04N 2213/001* (2013.01)

(58) Field of Classification Search
None
See application file for complete search history.

(56) References Cited

U.S. PATENT DOCUMENTS

| 4,853,592 A | 8/1989 | Strathman |
| 6,563,482 B1* | 5/2003 | Yamazaki ........... G02F 1/13454 345/87 |

(Continued)

FOREIGN PATENT DOCUMENTS

| CN | 101511035 A | 8/2009 |
| CN | 104506843 A | 4/2015 |

(Continued)

OTHER PUBLICATIONS

First Office Action dated Dec. 13, 2018 corresponding to Chinese application No. 201710599518.5.

(Continued)

*Primary Examiner* — Christopher G Findley
(74) *Attorney, Agent, or Firm* — Nath, Goldberg & Meyer; Joshua B. Goldberg

(57) ABSTRACT

The disclosure provides a three-dimensional (3D) display device including a pixel array and a grating. The pixel array includes a plurality of pixel columns, each of the plurality of pixel columns is inclined by an angle with respect to a direction in which an edge of the pixel array extends, and inclined angles of the pixel columns are substantially the same; each of the pixel columns is formed by arranging sub-pixels of three colors repeatedly in a fixed order, wherein dot pitches between any two adjacent sub-pixels in a same pixel column are substantially the same, and the sub-pixels in one of any two adjacent pixel columns in the plurality of pixel columns are staggered in turn with respect to respective sub-pixels in another pixel column of the two adjacent pixel columns and dot pitches between any two adjacent sub-pixels in the two adjacent pixel columns are substantially the same.

18 Claims, 2 Drawing Sheets

(56) References Cited

U.S. PATENT DOCUMENTS

| | | | |
|---|---|---|---|
| 2002/0070909 A1* | 6/2002 | Asano | H01L 27/326 345/76 |
| 2014/0036047 A1* | 2/2014 | Watanabe | H04N 13/15 348/54 |
| 2015/0130868 A1* | 5/2015 | Feng | G09G 3/2003 345/694 |
| 2016/0142704 A1* | 5/2016 | Hamagishi | H04N 13/376 348/59 |
| 2016/0155781 A1* | 6/2016 | Chaji | H01L 27/3218 257/89 |
| 2017/0294155 A1* | 10/2017 | Kim | H01L 27/3248 |

FOREIGN PATENT DOCUMENTS

| | | |
|---|---|---|
| CN | 104730720 A | 6/2015 |
| CN | 204965933 U | 1/2016 |
| CN | 105319795 A | 2/2016 |
| CN | 106896519 A | 6/2017 |
| JP | H7261166 A | 10/1995 |

OTHER PUBLICATIONS

The Second Office Action dated Jul. 15, 2019 corresponding to Chinese application No. 201710599518.5.

* cited by examiner

THREE-DIMENSIONAL DISPLAY DEVICE

CROSS-REFERENCE TO RELATED APPLICATION

The present application claims priority of the Chinese Patent Application No. 201710599518.5 filed on Jul. 21, 2017, the contents of which are incorporated herein in their entirety by reference.

TECHNICAL FIELD

The present disclosure relates to the field of display technology, in particular, to a three-dimensional (3D) display device.

BACKGROUND

A 3D display technology can make an image stereoscopic and vivid, i.e., the image is no longer limited to the plane of the screen, so that the audience feel as if they were personally on the scene.

In some cases, the 3D display device has a low resolution which is a half of a resolution of a 2D display device at the most. In order to improve the resolution of the 3D display device, a method for improving the resolution of the 2D display device can be used for reference, that is, sub-pixels may be borrowed in a rendering manner. However, in the 3D display device, since it is difficult to achieve a uniform dot pitch between the RGB sub-pixels on the premise that the aperture ratio meets the requirements, it is difficult to achieve a uniform 3D rendering, and thus the uniformity of color and brightness is low.

SUMMARY

The present disclosure provides a three-dimensional (3D) display device which includes a pixel array and a grating, wherein the pixel array includes a plurality of pixel columns, wherein each of the plurality of pixel columns is inclined by an angle with respect to a direction in which an edge of the pixel array extends, and inclined angles of the pixel columns are substantially the same; each of the pixel columns is formed by arranging sub-pixels of three colors repeatedly in a fixed order, wherein dot pitches between any two adjacent sub-pixels in a same pixel column are substantially the same, and the sub-pixels in one of any two adjacent pixel columns in the plurality of pixel columns are staggered in turn with respect to respective sub-pixels in another pixel column of the two adjacent pixel columns and dot pitches between any two adjacent sub-pixels in the two adjacent pixel columns are substantially the same, and a color of each of the sub-pixels is different from colors of all sub-pixels adjacent thereto;

the grating includes transmission regions and non-transmission regions which are arranged alternately and are disposed in accordance with the inclined angles; wherein the transmission regions correspond to respective spacing regions between any two adjacent pixel columns; the non-transmission regions correspond to the plurality of pixel columns.

In some embodiments, each of the sub-pixels has a circular shape.

In some embodiments, each of the sub-pixels has a square shape.

In some embodiments, the inclined angle is about 8° to about 20°.

In some embodiments, the inclined angle is about 14°.

In some embodiments, the plurality of pixel columns correspond to a plurality of views of different contents, and the plurality of views are arranged repeatedly in a fixed order in the plurality of pixel columns.

In some embodiments, an aperture ratio of the pixel array is about 20% to about 50%.

In some embodiments, the aperture ratio of the pixel array is about 25%.

In some embodiments, an aperture ratio of the grating is about 30% to about 50%.

In some embodiments, the 3D display device is an organic light-emitting diode 3D display device.

In some embodiments, the 3D display device is a liquid crystal 3D display device.

DETAILED DESCRIPTION

The 3D display device provided by the present disclosure will be described in detail below in conjunction with the drawings in order that a person skilled in the art can understand the technical solutions of the present disclosure better.

Figure 1:
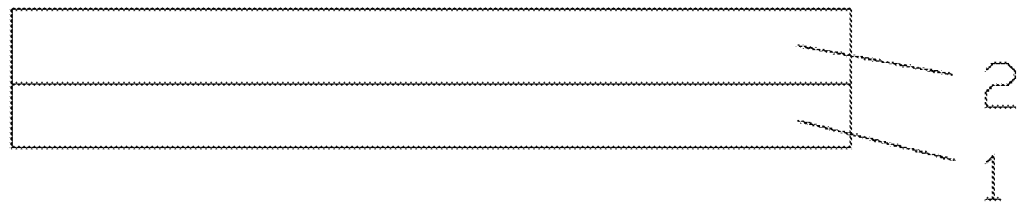
FIG. 1 is a schematic diagram of a structure of a 3D display device provided by an embodiment of the present disclosure.
Figure 2:
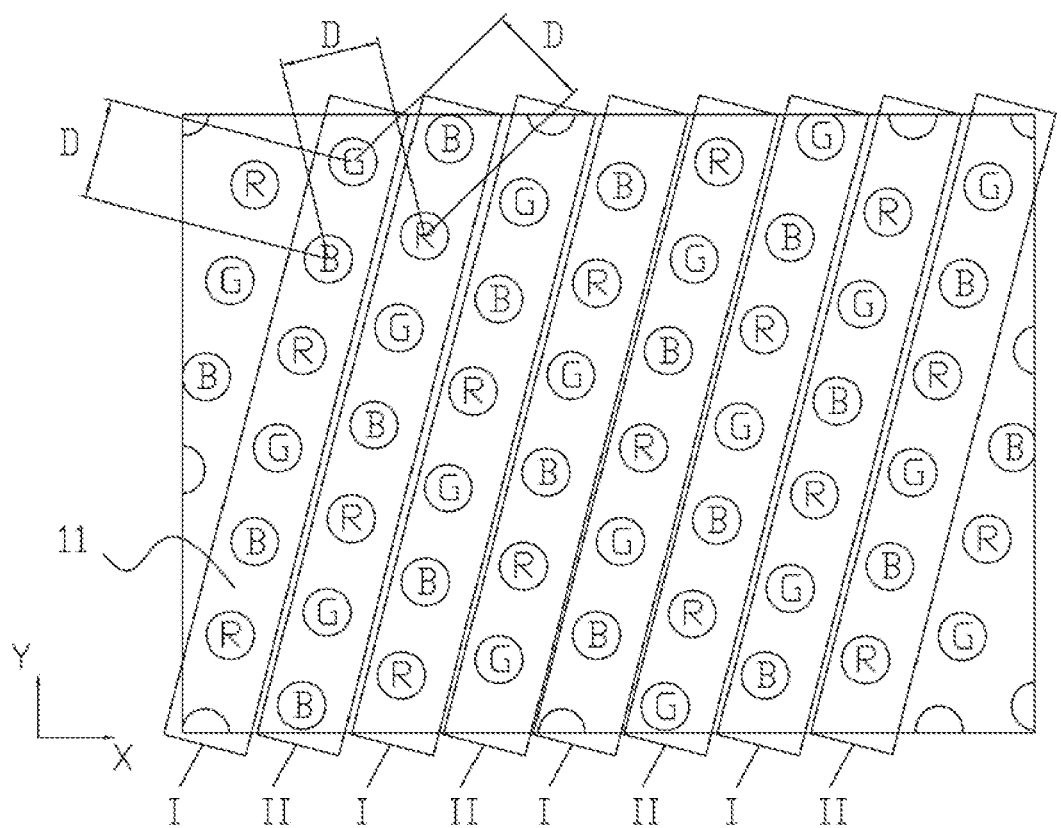
FIG. 2 is a structural diagram of a pixel array with circular pixels employed by embodiments of the present disclosure.

Referring to FIG. 1, a 3D display device provided by the embodiments of the present disclosure includes a display module 1 and a grating 2 provided at a light outgoing side of the display module 1. The display module 1 includes a pixel array which, as shown in FIG. 2, includes a plurality of pixel columns 11. Each of the plurality of pixel columns 11 is inclined by an angle with respect to a direction (e.g., the vertical direction in FIG. 2) in which an edge of the pixel array extends, and inclined angles of all the pixel columns are substantially the same. Each pixel column is formed by arranging sub-pixels of three colors, Red (R), Green (G), and Blue (B), repeatedly in a fixed order, and dot pitches between any two adjacent sub-pixels in a same pixel column 11 are substantially the same; the sub-pixels in one of any two adjacent pixel columns 11 in the plurality of pixel columns 11 are staggered in turn with respect to respective sub-pixels in another pixel column 11 of the two adjacent pixel columns 11, and dot pitches between any two adjacent sub-pixels in the two adjacent pixel columns 11 are substantially the same; and a color of each sub-pixel in the plurality of pixel columns 11 is different from colors of all sub-pixels adjacent thereto. The so-called dot pitch refers to a distance between the geometric centers of any two adjacent sub-pixels.

The term "substantially the same" means that two values are identical within the range of allowable error.

Further, as shown in FIG. 2, in each pixel column 11, the dot pitch between any two adjacent sub-pixels is D. Meanwhile, by inclining all the pixel columns 11 by a same angle with respect to the vertical direction, staggering the sub-pixels in one of any two adjacent pixel columns 11 in the plurality of pixel columns 11 in turn with respect to respective sub-pixels in another pixel column 11 of the two adjacent pixel columns 11, and making the dot pitches between any two adjacent sub-pixels in the two adjacent pixel columns 11 substantially the same, it is possible that each sub-pixel of each of the plurality of pixel columns 11 and two sub-pixels adjacent to the sub-pixel in another pixel column 11 are arranged in a regular triangle; said another pixel column 11 may be either of the two pixel columns 11 which are adjacent to the pixel column 11. That is, the dot pitch between any two of the three sub-pixels which are arranged in a regular triangle in two adjacent pixel columns 11 is D. In this way, for each sub-pixel in each pixel column 11, it is achieved that the dot pitches between the sub-pixel and the sub-pixels adjacent thereto are substantially the same, i.e., a uniform arrangement of the sub-pixels is achieved. Thereby, a uniform 3D rendering can be performed, and the uniformity of color and brightness can be improved. In this case, as shown in FIG. 2, the pixel array can also be seen as an array including a plurality of pixel rows, and each pixel row is also inclined by an angle with respect to the horizontal direction in accordance with the angle by which the pixel columns 11 are inclined with respect to the vertical direction.

The inclined angle with respect to the vertical direction should meet the following condition: the sub-pixels are arranged uniformly on the premise that the aperture ratio of the pixel array meets the requirements. As shown in FIG. 2, the vertical direction is the Y direction, and the horizontal direction is the X direction. In this condition, in some embodiments, the angle by which the pixel columns 11 is inclined with respect to the Y direction is about 8° to about 20° (i.e., the inclined angle with respect to the X direction is about 70° to about 82°), preferably is about 14°. Such an angle can meet the above requirement.

The term "about a value" means the range of allowable error with the value as a center. For example, as about 8° to about 20°, 7.9° to 20.1° is possible.

In some embodiments, the aperture ratio of the pixel array is about 20% to about 50%, preferably is about 25%. Such an aperture ratio leads to a higher utilization rate of light energy, and is particularly suitable to an Organic Light-Emitting Diode (OLED) 3D display device.

Figure 3:
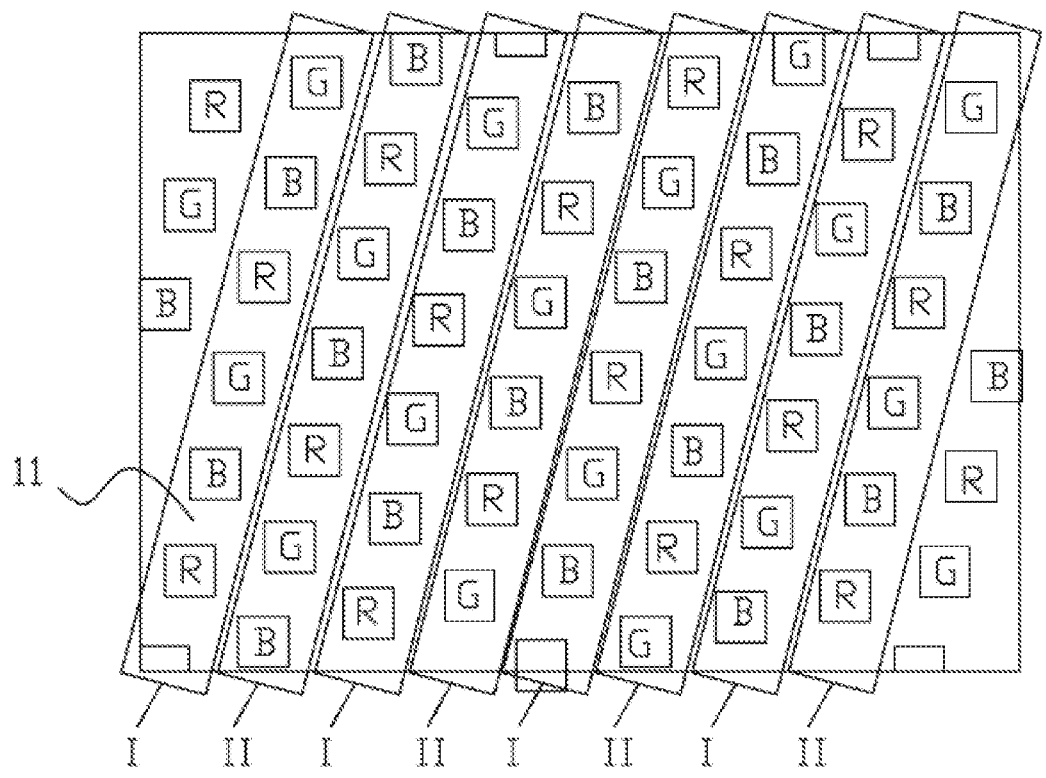
FIG. 3 is a structural diagram of a pixel array with square pixels employed by embodiments of the present disclosure.

In the present embodiment, as shown in FIG. 2, each sub-pixel has a circular shape. In practical applications, the shape of each sub-pixel may be square, as shown in FIG. 3. However, in a case that the diameter of a circular sub-pixel is substantially the same as the side length of a square sub-pixel and the dot pitches of sub-pixels of the both shape are substantially the same, the circular sub-pixel has less crosstalk in 3D displaying, and thereby improving the display effect.

Figure 4:
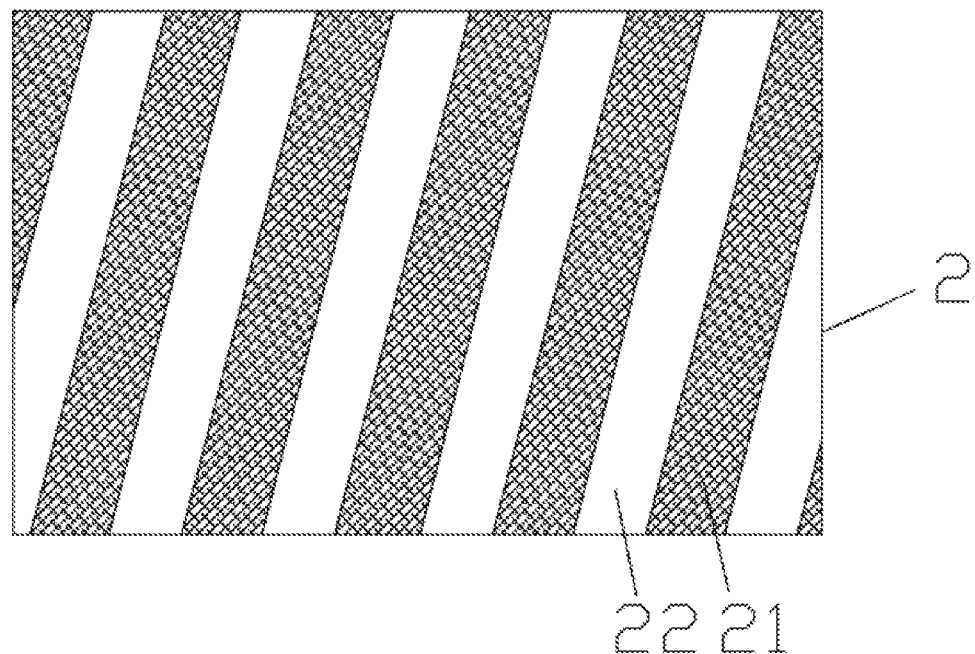
FIG. 4 is a structural diagram of a grating employed by embodiments of the present disclosure.

As shown in FIG. 4, the grating 2 is a slit grating for implementing a 3D display according to the principle of parallax barrier. Specifically, the grating 2 includes transmission regions 22 and non-transmission regions 21 which are arranged alternately and are disposed in accordance with the above-mentioned inclined angles with respect to the vertical direction. The transmission regions 22 correspond to respective spacing regions between two adjacent pixel columns 11. Specifically, the center lines of the respective transmission regions 22 are overlapped with the center lines of corresponding spacing regions as viewed from the direction perpendicular to the XY plane. The non-transmission regions 21 correspond to the plurality of pixel columns 11. With the configuration in which the transmission regions 22 correspond to the spacing regions between two adjacent pixel columns 11, light emitted from each sub-pixel in each pixel column 11 can go through a transmission region corresponding thereto.

In some embodiments, the aperture ratio of the grating 2 is about 30% to about 50%, which can eliminate the moire pattern (black stripes) in 3D displaying, and thus further improving the display effect.

Additionally, the configuration in which each of the plurality of pixel columns 11 is inclined by an angle with respect to the vertical direction facilitates 3D layout of multiple views. Specifically, as shown in FIGS. 2 and 3, the plurality of pixel columns 11 corresponds to two views of different contents (i.e., some pixel columns 11 correspond to the view I, while other pixel columns 11 correspond to the view II), and the two views are alternately arranged in the plurality of pixel columns 11. Obviously, in practical applications, three or more views for displaying contents different from each other are also possible.

In practical applications, the above 3D display device may be an Organic Light-Emitting Diode (OLED) 3D display device, or a liquid crystal 3D display device.

It will be appreciated that above implementations are only exemplary implementations for illustrating the principle of the present disclosure, and the present disclosure is not limited thereto. An ordinary person skilled in the art may make various modifications and improvements without departing from the spirit and essence of the present disclosure. These modifications and the improvements should be considered within the protection scope of the present disclosure.

What is claimed is:

1. A three-dimensional (3D) display device, comprising:
a pixel array, comprising a plurality of pixel columns, wherein each of the plurality of pixel columns is inclined by an angle with respect to a direction in which an edge of the pixel array extends, and inclined angles of the plurality of pixel columns are substantially the same; each of the pixel columns is formed by arranging sub-pixels of three colors repeatedly in a fixed order, wherein first dot pitches between any two adjacent sub-pixels in a same pixel column are substantially the same, and the sub-pixels in one of any two adjacent pixel columns in the plurality of pixel columns are staggered in turn with respect to respective sub-pixels in another pixel column of the two adjacent pixel columns such that second dot pitches between any sub-pixel of one color in one pixel column of the two adjacent pixel columns and two adjacent sub-pixels of two colors different than the one color in another pixel column of the two adjacent pixel columns are substantially the same, and a color of each of the sub-pixels is different from colors of all sub-pixels adjacent thereto; and
a grating, comprising transmission regions and non-transmission regions which are arranged alternately and are disposed in accordance with the inclined angles; wherein the transmission regions correspond to respective spacing regions between any two adjacent pixel columns and a center line of each transmission region is overlapped with a center line of a spacing region corresponding to the transmission region; the non-transmission regions correspond to the plurality of pixel columns,
wherein the first dot pitch and the second dot pitch are substantially the same.

2. The 3D display device of claim 1, wherein each of the sub-pixels has a circular shape.

3. The 3D display device of claim 1, wherein each of the sub-pixels has a square shape.

4. The 3D display device of claim 1, wherein the inclined angle is about 8° to about 20°.

5. The 3D display device of claim 2, wherein the inclined angle is about 8° to about 20°.

6. The 3D display device of claim 3, wherein the inclined angle is about 8° to about 20°.

7. The 3D display device of claim 4, wherein the inclined angle is about 14°.

8. The 3D display device of claim 1, wherein the plurality of pixel columns correspond to a plurality of views of different contents, and the plurality of views are arranged repeatedly in a fixed order in the plurality of pixel columns.

9. The 3D display device of claim 2, wherein the plurality of pixel columns correspond to a plurality of views of different contents, and the plurality of views are arranged repeatedly in a fixed order in the plurality of pixel columns.

10. The 3D display device of claim 3, wherein the plurality of pixel columns correspond to a plurality of views of different contents, and the plurality of views are arranged repeatedly in a fixed order in the plurality of pixel columns.

11. The 3D display device of claim 1, wherein an aperture ratio of the pixel array is about 20% to about 50%.

12. The 3D display device of claim 2, wherein an aperture ratio of the pixel array is about 20% to about 50%.

13. The 3D display device of claim 3, wherein an aperture ratio of the pixel array is about 20% to about 50%.

14. The 3D display device of claim 11, wherein the aperture ratio of the pixel array is about 25%.

15. The 3D display device of claim 1, wherein an aperture ratio of the grating is about 30% to about 50%.

16. The 3D display device of claim 2, wherein an aperture ratio of the grating is about 30% to about 50%.

17. The 3D display device of claim 3, wherein an aperture ratio of the grating is about 30% to about 50%.

18. The 3D display device of claim 1, wherein the 3D display device is an organic light-emitting diode 3D display device or a liquid crystal 3D display device.

* * * * *